United States Patent
Mekkattuparamban

(10) Patent No.: US 7,260,118 B2
(45) Date of Patent: Aug. 21, 2007

(54) METHODS AND SYSTEMS FOR GENERATING AN ACCURATE ADAPTIVE CLOCK

(75) Inventor: Joji Thomas Mekkattuparamban, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 11/112,657

(22) Filed: Apr. 21, 2005

(65) Prior Publication Data

US 2006/0242516 A1    Oct. 26, 2006

(51) Int. Cl.
*H04J 3/06* (2006.01)

(52) U.S. Cl. .................................... 370/507; 370/516

(58) Field of Classification Search ............... None
See application file for complete search history.

(56) References Cited

U.S. PATENT DOCUMENTS

| | | | | |
|---|---|---|---|---|
| 6,898,213 | B1 * | 5/2005 | Shimelmitz et al. | 370/537 |
| 6,944,189 | B2 * | 9/2005 | Pines et al. | 370/503 |
| 7,020,791 | B1 * | 3/2006 | Aweya et al. | 713/400 |
| 7,133,415 | B2 * | 11/2006 | Zelig et al. | 370/466 |

* cited by examiner

*Primary Examiner*—Cassandra Cox
(74) *Attorney, Agent, or Firm*—Marger Johnson & McCollom, P.C.

(57) ABSTRACT

A method for generating an accurate adaptive clock is disclosed. The method includes accessing data at a first clock rate, generating an adaptive clock that has an adaptive clock rate that is based on the arrival rate of said data, accessing data related to the first clock rate and the adaptive clock rate. The adaptive clock rate is adjusted based on a determined relationship between the first clock rate and the adaptive clock rate.

20 Claims, 6 Drawing Sheets

METHODS AND SYSTEMS FOR GENERATING AN ACCURATE ADAPTIVE CLOCK

TECHNICAL FIELD

Embodiments of the present invention pertain to methods and systems for generating an accurate adaptive clock.

BACKGROUND ART

Circuit Emulation over IP (CEoIP) is a technology that provides a circuit like relationship to systems that are coupled together via the Internet. Because the coupled systems do not share a common clock source, it is necessary to derive an adaptive clock. Limitations on the accuracy of clocks derived using adaptive clock algorithms determine the type of communication that is possible between systems that employ such.

There are inherent limitations to the accuracy of a clock derived using adaptive clock algorithms. One such limitation is clock wander. Clock wander is an inherent consequence of adaptive clock derivation. While a limited amount of clock wander is fine for many applications, certain applications such as mobile wireless applications require a more accurate clock.

Standard algorithms for generating an adaptive clock rely on packet arrival versus departure characteristics as a means to derive the clock. For example, technologies such as the Bora Bora Network Module uses an algorithm that compares the average dejitter buffer levels identified within a given period to derive the clock.

In order to meet conventional wander specifications a clock accuracy of 15 parts per billion or better is required. One serious drawback of conventional methodologies is that network behavior can cause occasional errors in the calculations. It should be appreciated that network effects can be excluded from the calculations to a certain extent by using a large number of samples. However, the number of samples cannot be increased beyond a certain limit as such increases would increase the time taken for computation and which in turn would increase the wander.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
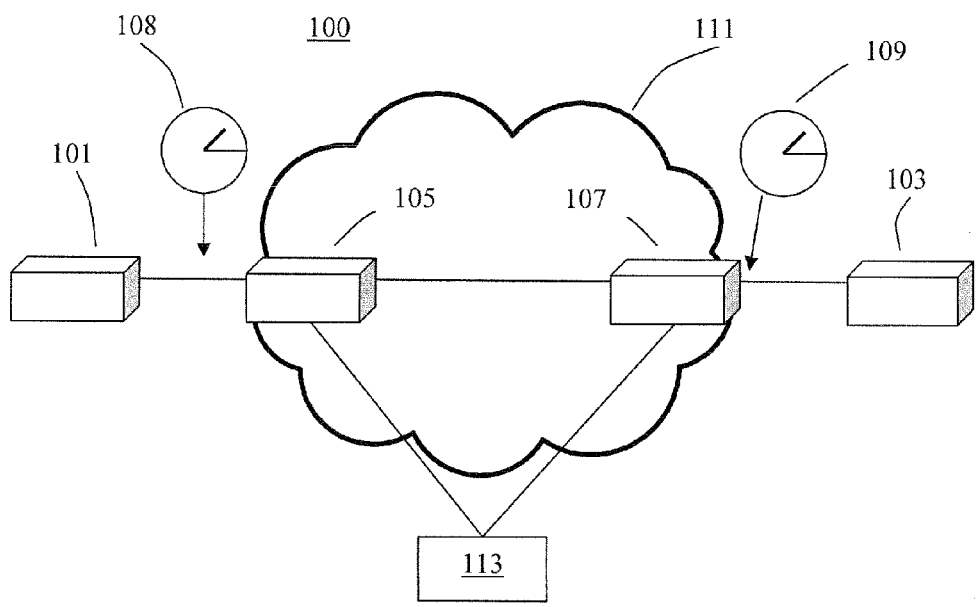
FIG. 1 shows a circuit emulation over Internet protocol (CEoIP) network including a system for providing an accurate adaptive clock according to one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer system, server system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "accessing" or "determining" or "adjusting" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

Circuit Emulation over Internet Protocol Network According to One Embodiment of the Present Invention FIG. 1 shows a circuit emulation over Internet protocol (CEoIP) network 100 including a system 113 for providing an accurate adaptive clock according to one embodiment of the present invention. Exemplary embodiments, utilize independent views of a master and an adaptive clock located respectively at source and destination sides of a network, to determine an error between the clocks. The adaptive clock is controlled by making adjustments based on the determined error. In the FIG. 1 embodiment, network 100 includes source side network component 101, destination side network component 103, source side data relay component 105, destination side data relay component 107, master clock 108, adaptive clock 109, Internet 111 and system 113 for providing an accurate adaptive clock.

Source side network component 101 transmits data at the master clock rate. In one embodiment, a master clock 108 that is associated with the source side network component 101 resides thereat. In another embodiment, the master clock that is associated with the source side network component 101 resides at a location remote from the source side network component. In the FIG. 1 embodiment, source side network component 101 is located at a network endpoint. The source side network component 101 can include but is not limited to customer premise equipment (CPE).

Destination side network component 103 receives data at the adaptive clock rate. In the FIG. 1 embodiment, destination side network component 103 is located at a network endpoint. The destination side network component 103 can include but is not limited to components such as customer premise equipment (CPE).

Source side data relay component 105 relays data transmitted from source side network component 101 to destination side network component 103 via the Internet 111 and destination side data relay component 107. In one embodiment, the data that is relayed is transmitted at the master clock rate. In addition, source side data relay component 105 relays data received from destination side data relay component 107 to source side network component 101 at the master clock rate. The source side data relay component 105 can include, but is not limited to being implemented using a relay, a switch or a router.

In one embodiment, as previously mentioned, the data that source side data relay component 105 receives from source side network component 101 can be transmitted to destination side data relay component 107 via the Internet at the master clock rate. However, the data that is received by source side data relay component 105 from destination side data relay component 107 via the Internet is received by source side data relay component 105 at the adaptive clock rate. In one embodiment, source side data relay component 105 can perform computations to determine if there exists a difference between the adaptive clock rate and the master clock rate. This information can be collected by source side data relay component 105 and accessed (after relay from source side data relay component 105) by components of the system for providing an accurate adaptive clock 109 that is associated with destination side data relay component 107.

Destination side data relay component 107 receives data relayed from source side data relay component 105 and relays the data that is received to destination side network component 103. In addition, destination side data relay component 107 receives data sent from destination side network component 103 and relays the data that is received from destination side network component 103 to source side network component 101. In one embodiment, destination side data relay component 107 relays data from destination side network component 103 to source side network component 101 via the Internet 111 and source side data relay component 105.

In one embodiment components of the system 113 for providing the accurate adaptive clock 109 can be associated with destination side data relay component 107. In one embodiment, data packets that are received by destination side data relay component 107 from source side data relay component 105 can be used to generate the adaptive clock 109. In one embodiment the adaptive clock 109 can be derived by components of system 113 based on data packet arrival rates. In addition, information that is received from source side data relay component 105 that details any error that may exist between the adaptive clock 109 and the master clock 108 can be employed to correct the error that is observed by adjusting the adaptive clock rate.

In one embodiment, the information that is sent can include a computation of the error between the adaptive clock 109 and the master clock 108. In an alternate embodiment, the information that is sent describes the master clock rate and the adaptive clock rate but does not include a computation of any error between them (in such case the computation can be performed by resources associated with the receiver of the information).

According to one embodiment, components and operations embodied by the system 113 for generating an accurate adaptive clock may be encompassed by components and operations associated with destination side data relay component or both destination side data relay component and source side data relay component. In another embodiment, components and operations embodied by the system 113 for generating an accurate adaptive clock may be separate from, but operate in cooperation with components and operations associated with the destination side data relay component or both destination side data relay component and source side data relay component.

Operation

In operation, the source side network component 101 transmits data over the Internet 111 that is directed to destination side network component 103 at a master clock rate that is determined by a master clock 108 that is coupled to or resident at the source side network component 101. Source side data relay component 105 receives data from the source side network component 101 and sends the data that is received to destination side network components via the Internet 111. Destination side data relay component 107 receives data sent over the Internet 111 by source side data relay component 105, and that is directed to destination side network component 103, to destination side network component 103.

In one embodiment, an adaptive clock 109 is derived from the packet data that is received by the destination side data relay component 107 based on packet arrival rate. The adaptive clock 109 that is generated is used to transmit data to the destination side network component 103. In addition, destination side network component 103 transmits data back to destination side data relay component 107 at the adaptive clock rate. In turn, destination side data relay component 107 sends data over the Internet 111 at a rate that is determined by the adaptive clock 109. In one embodiment, the adaptive clock 109 is coupled to or resident at destination side data relay component 107.

Figure 2:
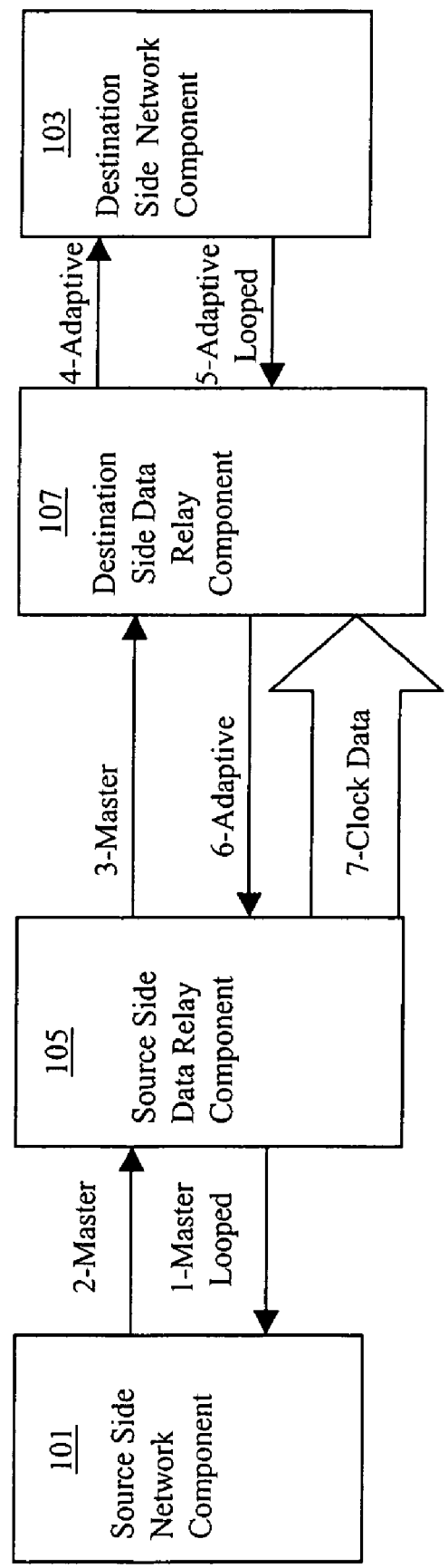
FIG. 2 is a diagram that illustrates dataflow between source side and destination side network components according to one embodiment of the present invention.

FIG. 2 is a diagram 200 that illustrates dataflow between and among source side and destination side network components according to one embodiment of the present invention. In the FIG. 2 embodiment, dataflow within network (e.g., 100 in FIG. 1) is represented by data transmissions 1-7.

Data transmission 2 represents data that is sent at the master clock rate from source side network component (e.g. 101 in FIG. 1) to source side data relay component 105. In one embodiment, source side data relay component (e.g., 105 in FIG. 1) uses the master clock (e.g., 108 in FIG. 1) to transmit data back to source side network component (e.g., 101 in FIG. 1) as is represented in FIG. 2 by data transmission 1. In addition, source side data relay component (e.g., 105 in FIG. 1) sends data (e.g., IP packets) to the network (as represented by data transmission 3) at a rate determined by the master clock 108. In one embodiment, destination side data relay component (e.g., 107 in FIG. 1) derives an adaptive clock (e.g., 109 FIG. 1) based on the arrival rate of packets sent from source side data relay component (e.g., 105 in FIG. 1).

In one embodiment, the adaptive clock (e.g., 109 in FIG. 1) can be used to transmit data to destination side network component (e.g., 103 in FIG. 1) as represented by data transmission 4. Destination side network component (e.g., 103 in FIG. 1) sends data back to destination side data relay component (e.g., 107 in FIG. 1) at the adaptive clock rate as represented by data transmissions 5. It should be appreciated that destination side data relay component (e.g., 107 FIG. 1) sends data to the network at a rate determined by the adaptive clock as is represented by data transmission 6. Data transmission 7 represents information (error computation, clock rate details) that is sent from source side data relay component (e.g., 105 in FIG. 1) that provides a source side view of clock difference that is used to eliminate error in the computation of the adaptive clock rate.

Figure 3B:
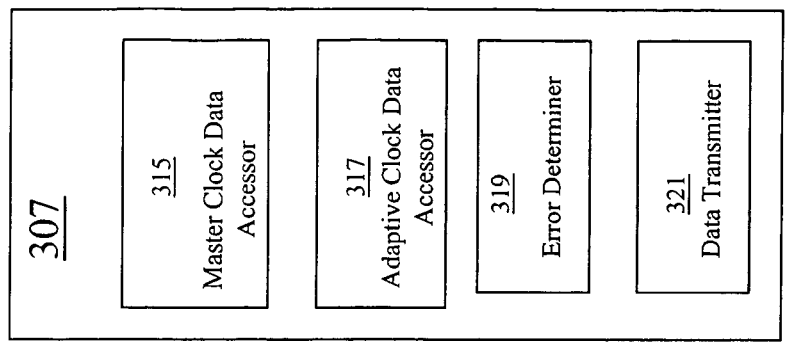
FIG. 3B shows components of the clock error computer according to one embodiment of the present invention.
Figure 3A:
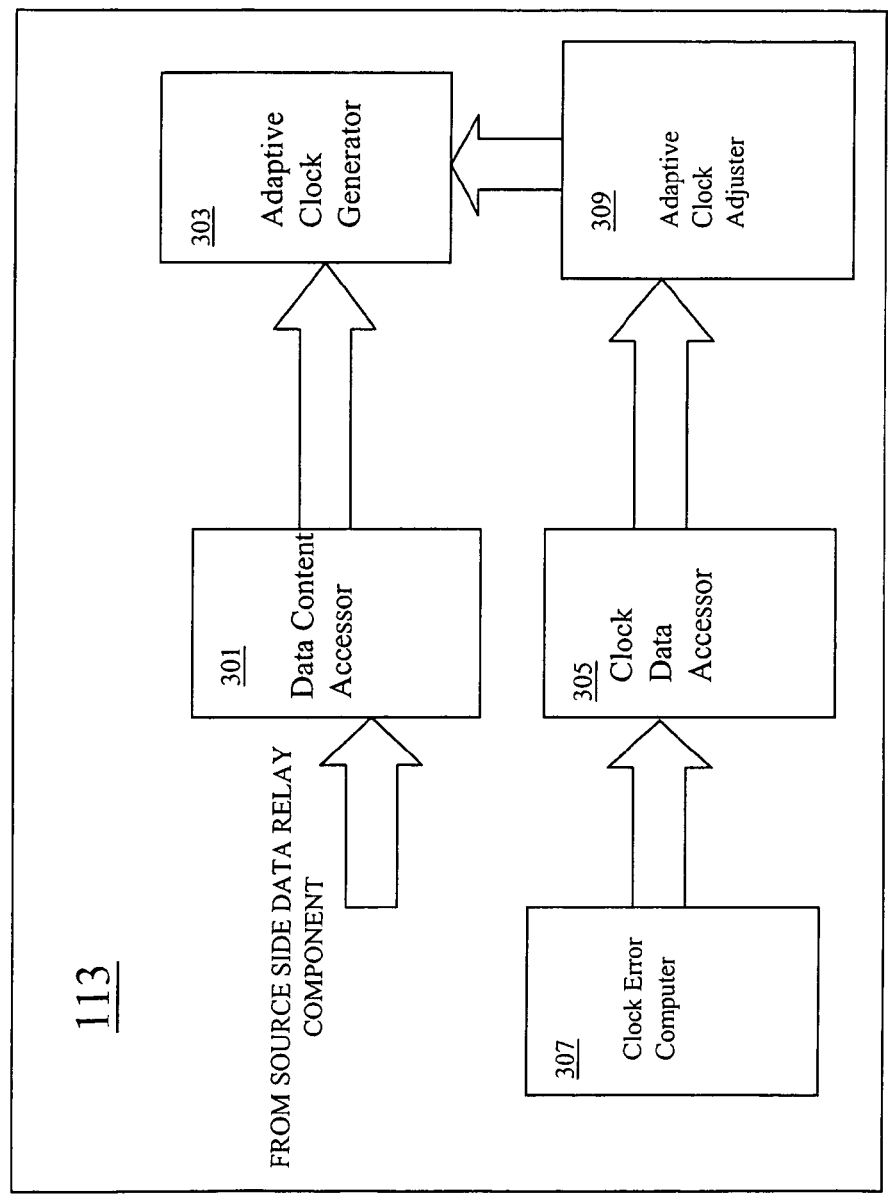
FIG. 3A shows system for generating an accurate adaptive clock according to one embodiment of the present invention.

FIG. 3A shows system 113 for generating an accurate adaptive clock according to one embodiment of the present invention. In the FIG. 3A embodiment, system 113 includes data content accessor 301, adaptive clock generator 303, clock data accessor 305, clock error computer 307 and adaptive clock adjuster 309.

Data content accessor 301 accesses data (e.g., IP packets) from the network that is transmitted from the network source side of a CEoIP network at the master clock rate. In one embodiment, data that is generated at a source side device (e.g., PBX etc.) can be relayed via intermediate components (e.g., routers, etc.) and accessed by data content accessor 301.

Adaptive clock generator 303 generates an adaptive clock that has an adaptive clock rate that is based on the arrival rate of IP packets from a network source side device (e.g., router, switch etc.). In one embodiment, other destination side network components utilize the adaptive clock that is generated by the adaptive clock generator 303 in the transmission of data.

Clock data accessor 305 accesses data related to the master clock rate and the adaptive clock rate as observed by source side components. The clock data that is accessed by clock data accessor 305 is used to adjust the rate of the adaptive clock if the master clock rate and the adaptive clock rate do not match.

Clock error computer 307 computes the error between the master clock rate and the adaptive clock rate if the master clock rate and the adaptive clock rate do not match. Information related to the error is supplied to the adaptive clock adjuster 309. In one embodiment, the clock error computer 307 is associated with the source side data relay component (e.g., 105 in FIG. 1). In an alternate embodiment, the clock error computer 307 is associated with the destination side data relay component (e.g., 107 in FIG. 1). Moreover, in one embodiment, the clock error computer 307 and its operations can be encompassed by components and operations of the data relay component (e.g., 105 or 107 in FIG. 1) that it is associated with. In another embodiment, the clock error computer 307 and its operations can be separate from the components and operations of the data relay component (e.g., 105 or 107 in FIG. 1) that it is associated with but operate cooperatively with those components and operations.

In one embodiment, when clock error computer 307 is associated with components and operations of destination side data relay component, components (e.g., software and or hardware) associated with source side data relay component can be used to register and report the master clock rate and the adaptive clock rate as seen at the source side. In one embodiment this data is transmitted to destination side data relay component and is computed by the clock error computer 307.

Adaptive clock adjuster 309 adjusts the adaptive clock rate if the master clock rate and the adaptive clock rate do not match. In one embodiment, if the adaptive clock rate has been determined to be different from the master clock rate the adaptive clock adjuster adjusts the rate of the adaptive clock to match that of the master clock.

In one embodiment, the clock error computer 307 and the adaptive clock adjuster 309 can operate cooperatively and perform operations that include: (1) averaging separately measurements of the master clock rate and the adaptive clock rate; (2) comparing these measurements for filtering; and (3) filtering based on how well the two measurements agree.

According to one embodiment, components and operations embodied by the system 113 for generating an accurate adaptive clock may be encompassed by components and operations associated with destination side data relay component or both destination side data relay component and source side data relay component. In another embodiment, components and operations embodied by the system 113 for generating an accurate adaptive clock may be separate from, but operate in cooperation with components and operations associated with the destination side data relay component or both destination side data relay component and source side data relay component.

FIG. 3B shows components of the clock error computer 307 according to one embodiment of the present invention. In the FIG. 3B embodiment, clock error computer 307 includes master clock data accessor 315, adaptive clock data accessor 317, error determiner 319 and data transmitter 321.

Master clock data accessor 315 accesses data (e.g., IP packets) that is transmitted from source side components at the master clock rate. In one embodiment, data can be transmitted from a source side component (e.g., PBX etc.) and relayed via intermediate components (e.g., routers, etc.) to destination side components where it can be accessed by data accessor 315.

Adaptive clock data accessor 317 accesses data (e.g., IP packets) from the network (e.g.,) that are transmitted from destination side components at the adaptive clock rate. In one embodiment, data can be transmitted from a destination side component (e.g., PBX etc.) and relayed via intermediate components (e.g., routers, etc.) to source side components where it is accessed by data accessor 317.

Figure 3C:
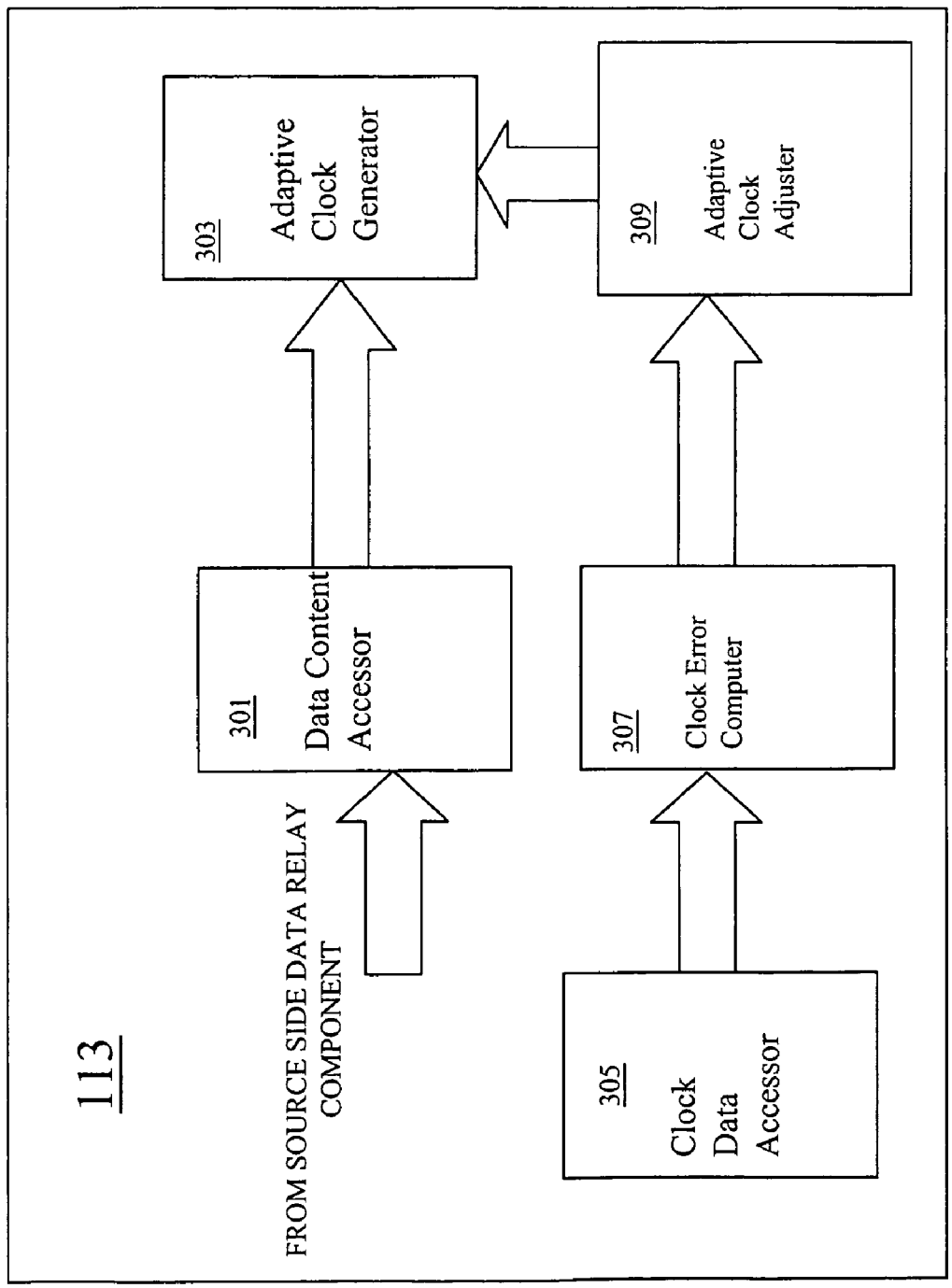
FIG. 3C shows system for generating an accurate adaptive clock according to an alternate embodiment of the present invention.

Error determiner 319 determines a relationship between the master clock rate and the adaptive clock rate. In one embodiment, an error between the master clock rate and the adaptive clock rate is determined by averaging separately rate measurements of data packets transmitted at the master clock rate and at the adaptive clock rate and determining the difference between the average measurements. Data transmitter 321 transmits data related to the error that is determined between said first clock rate and said adaptive clock rate. FIG. 3C shows an embodiment of system 113 for generating an accurate adaptive clock according to one embodiment of the present invention when clock error computer 307 is associated with the destination side data relay component (e.g., 107 in FIG. 1).

Exemplary Operations in Accordance with Embodiments of the Present Invention

Figures 4, 5:
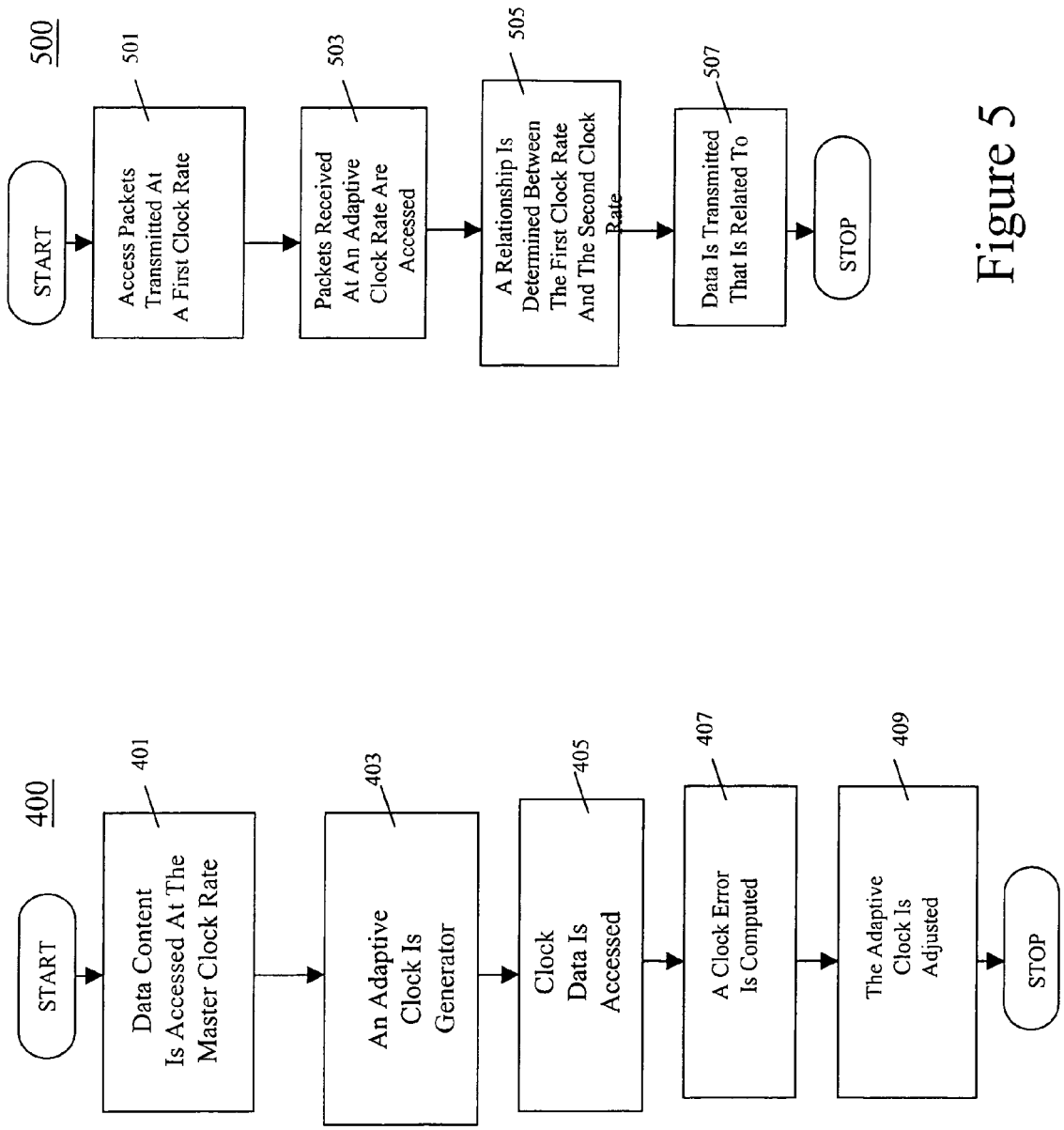
FIG. 4 is a flowchart of the steps performed in a method for generating an accurate adaptive clock according to one embodiment of the present invention.
FIG. 5 is a flowchart of the steps performed in a method for generating an accurate adaptive clock according to one embodiment of the present invention.

FIGS. 4 and 5 are flowcharts of steps performed in a method for providing an accurate adaptive clock in accordance with one embodiment of the present invention. The flowcharts illustrate processes of the present invention which, in one embodiment, are carried out by processors and electrical components under the control of computer readable and computer executable instructions. The computer readable and computer executable instructions may reside, for example, in data storage features such as computer usable volatile memory and/or computer usable non-volatile memory. However, the computer readable and computer executable instructions may reside in any type of computer readable medium. Although specific steps are disclosed in these flowcharts, such steps are exemplary. That is, the present invention is well suited to performing various other steps or variations of the steps recited in FIGS. 4 and 5. Within the present embodiment, it should be appreciated that the steps of the flowchart may be performed by software, by hardware or by any combination of software and hardware.

FIG. 4 is a flowchart 400 of the steps performed in a method for generating an accurate adaptive clock according to one embodiment of the present invention.

At step 401, data is accessed at a first clock rate. In one embodiment, a data content accessor (e.g., 301 in FIG. 3) accesses data (e.g., IP packets) from the network that is transmitted from the network source side at the master clock rate. In one embodiment, data that is generated at a source side device (e.g., PBX etc.) can be relayed via intermediate components (e.g., routers, etc.) and accessed by data content accessor (e.g., 301 in FIG. 3).

At step 403, an adaptive clock is generated that has an adaptive clock rate that is based on the arrival rate of said packets. In one embodiment, an adaptive clock generator (e.g., 303 in FIG. 3) generates an adaptive clock that has an adaptive clock rate that is based on the arrival rate of IP packets from a network source side device (e.g., router, switch etc.). In one embodiment, other destination side network components utilize the adaptive clock that is generated-by the adaptive clock generator (e.g., 303 in FIG. 3) in the transmission of data.

At step 405, data is accessed that is related to the master clock rate and the adaptive clock rate. Clock data accessor (e.g., 305 in FIG. 3) accesses data related to the master clock rate and the adaptive clock rate as observed by source side components. The clock data that is accessed by clock data accessor (e.g., 305 in FIG. 3) is used to adjust the rate of the adaptive clock if the master clock rate and the adaptive clock rate do not match.

At step 407, the adaptive clock rate is adjusted based on a determined relationship between said first clock rate and said adaptive clock rate. Adaptive clock adjuster (e.g., 309 in FIG. 3) adjusts the adaptive clock rate if the master clock rate and the adaptive clock rate do not match. In one embodiment, if the adaptive clock rate has been determined to be different from the master clock rate the adaptive clock adjuster adjusts the rate of the adaptive clock to match that of the master clock.

In one embodiment, a clock error computer (e.g., 307 in FIG. 3) and the adaptive clock adjuster (e.g., 309 in FIG. 3) can operate cooperatively and perform operations that include: (1) averaging separately measurements of the master clock rate and the adaptive clock rate; (2) comparing these measurements for filtering; and (3) filtering based on how well the two measurements agree.

FIG. 5 is a flowchart 500 of steps in a method for generating an accurate adaptive clock according to one embodiment of the present invention.

At step 501, packets transmitted at a first clock rate are accessed. In one embodiment, data can be transmitted from a source side component (e.g., PBX etc.) and relayed via intermediate components (e.g., routers, etc.) to destination side components where it can be accessed by data accessor 315.

At step 503, packets received at an adaptive clock rate are accessed. In one embodiment, data can be transmitted from a destination side component (e.g., PBX etc.) and relayed via intermediate components (e.g., routers, etc.) to source side components where it is accessed by data accessor 317.

At step 505, a relationship is determined between said first clock rate and said adaptive clock rate. In one embodiment, an error between the master clock rate and the adaptive clock rate is determined by averaging rate measurements of data packets transmitted at the master clock rate and at the adaptive clock rate and determining the difference between the average measurements.

At step 507, data is transmitted that is related to said relationship between said first clock rate and said adaptive clock rate.

Exemplary Hardware in Accordance with Embodiments of the Present Invention

Figure 6:
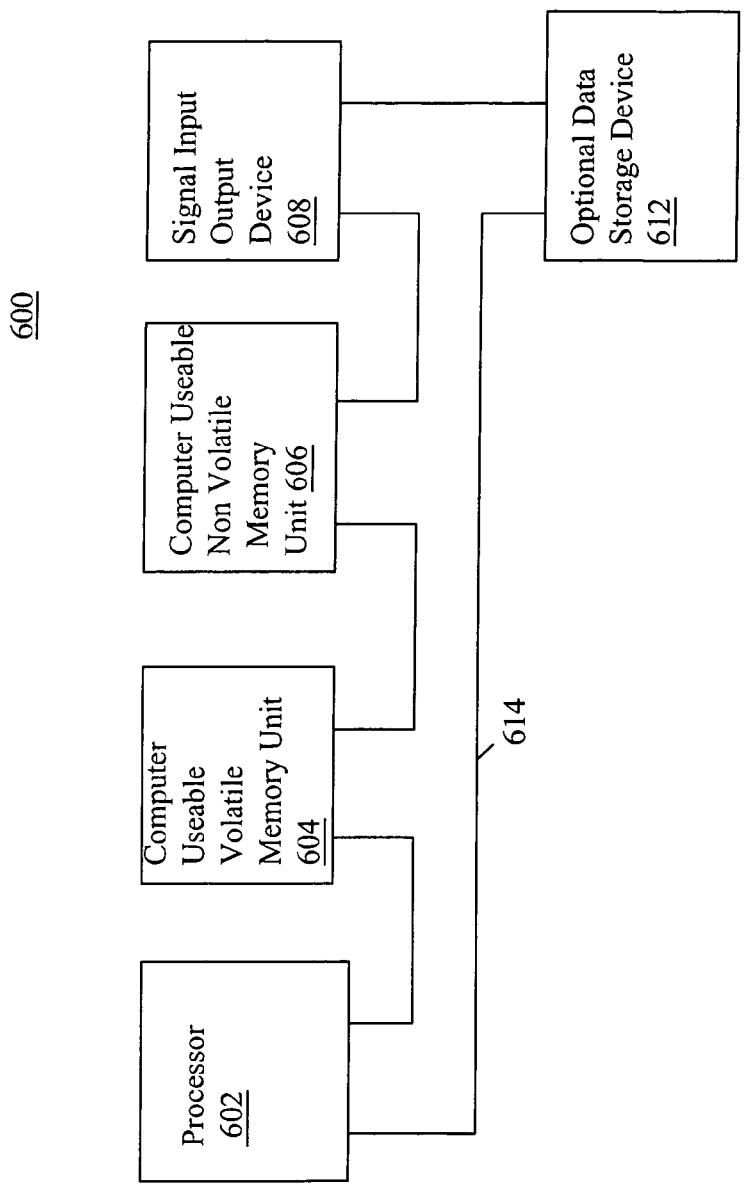
FIG. 6 is a block diagram of an exemplary computer system in accordance with embodiments of the present invention.

FIG. 6 is a block diagram of an exemplary computer system 600 in accordance with embodiments of the present invention. System 600 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 600 and executed by a processor(s) of system 600. When executed, the instructions cause computer 600 to perform specific actions and exhibit specific behavior which is described in detail below. According to one embodiment, the instructions may include code that when executed perform the master and adaptive clock monitoring and adaptive clock adjustments described herein.

Computer system 600 of FIG. 6 comprises an address/data bus 614 for communicating information, one or more central processors 602 coupled with bus 614 for processing information and instructions. Central processor unit 602 may be a microprocessor or any other type of processor. The computer 600 also includes data storage features such as a computer usable volatile memory unit 604 (e.g., random access memory, static RAM, dynamic RAM, etc.) coupled with bus 614 for storing information and instructions for central processor(s) 602, a computer usable non-volatile memory unit 606 (e.g., read only memory, programmable ROM, flash memory, EPROM, EEPROM, etc.) coupled with bus 614 for storing static information and instructions for processor(s) 602. System 600 also includes one or more signal generating and receiving devices 608 coupled with bus 614 for enabling system 600 to interface with other electronic devices.

The communication interface(s) 608 of the present embodiment may include wired and/or wireless communication technology such as a wireless telephone circuitry. For example, in some embodiments, the communication interface 608 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 600 may also include a computer usable mass data storage device 612 such as a magnetic or optical disk and disk drive (e.g., hard drive or floppy diskette) coupled with bus 614 for storing information and instructions.

As noted above with reference to exemplary embodiments thereof, a method for generating an accurate adaptive clock is disclosed. The method includes accessing data at a first clock rate, generating an adaptive clock that has an adaptive clock rate that is based on the arrival rate of said data, accessing data related to the first clock rate and the adaptive clock rate. The adaptive clock rate is adjusted based on a determined relationship between the first clock rate and the adaptive clock rate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating an accurate adaptive clock, comprising:
   accessing data at a first clock rate;
   generating an adaptive clock that has an adaptive clock rate that is based on an arrival rate of said data;
   accessing data related to said first clock rate and said adaptive clock rate;
   accessing an average measure of said first clock rate;
   accessing an average measure of said adaptive clock rate; and
   adjusting said adaptive clock rate based on a comparison of the average measures of said first clock rate and said adaptive clock rate.

2. The method of claim 1 wherein said comparison of the average measures of said first clock rate and said adaptive clock rate is a difference between the average measures of said first clock rate and said adaptive clock rate.

3. The method of claim 1 wherein data related to said first clock rate and said adaptive clock rate are accessed at a source side component associated with transmitting data at said first clock rate.

4. The method of claim 3 wherein said adaptive clock rate is generated based on data arriving at a destination side component.

5. A method for generating an accurate adaptive clock, comprising:
   accessing data at a first clock rate;
   generating an adaptive clock that has an adaptive clock rate that is based on an arrival rate of said data;
   accessing data related to said first clock rate and said adaptive clock rate;
   adjusting said adaptive clock rate based on a determined relationship between said first clock rate and said adaptive clock rate;
   averaging a measure of said first clock rate and a measure of said adaptive clock rate;
   comparing the averaged measure of said first clock rate and the averaged measure of said adaptive clock rate for filtering; and
   filtering based on how well the two averaged measures agree.

6. A system for generating an accurate adaptive clock, comprising:
   an accessor for accessing data at a first clock rate;
   an adaptive clock generator for generating an adaptive clock that has an adaptive clock rate that is based on the arrival rate of said data;
   an accessor for accessing data related to said first clock rate and said adaptive clock rate;
   an accessor for accessing an average measure of said first clock rate;
   an accessor for accessing an average measure of said adaptive clock rate; and
   an adaptive clock adjuster for adjusting said adaptive clock rate based on a comparison of the average measures of said first clock rate and said adaptive clock rate.

7. The system of claim 6 wherein said comparison of the average measures of said first clock rate and said adaptive clock rate is a difference between the average measures of said first clock rate and said adaptive clock rate.

8. A system for generating an accurate adaptive clock, comprising:
   an accessor for accessing data at a first clock rate;
   an adaptive clock generator for generating an adaptive clock that has an adaptive clock rate that is based on the arrival rate of said data;
   an accessor for accessing data related to said first clock rate and said adaptive clock rate;
   an adaptive clock adjuster for adjusting said adaptive clock rate based on a determined relationship between said first clock rate and said adaptive clock rate;
   averaging a measure of said first clock rate and a measure of said adaptive clock rate;
   comparing the averaged measure of said first clock rate and the averaged measure of said adaptive clock rate for filtering; and
   filtering based on how well the two averaged measures agree.

9. The method of claim 6 wherein the accessor is associated with a source side component that transmits data at the first clock rate.

10. A method for generating an accurate adaptive clock, comprising:
    accessing packets transmitted to a destination side component at a first clock rate;
    accessing packets received from the destination side component at an adaptive clock rate, where the adaptive clock rate is based on an arrival rate of the transmitted packets at the destination side component;

determining a difference between said first clock rate and said adaptive clock rate; and adjusting said adaptive clock rate according to the difference.

11. The method of claim 10 wherein said packets transmitted at said first clock rate are accessed from a source side component of a network that includes source and destination sides.

12. The method of claim 11 wherein said packets received at said adaptive clock rate are also accessed from said source side component.

13. The method of claim 10 wherein said difference is an error between the first clock rate and the adaptive clock rate.

14. The method of claim 10 wherein said difference between the first clock rate and the adaptive clock rate is determined by averaging rate measurements of data packets transmitted at the first clock rate and at the adaptive clock rate and determining the difference between the average measurements.

15. A system for generating an accurate adaptive clock for a network that comprises network source side and network destination side components, comprising:

an accessor for accessing data that is transmitted at a first clock rate;

an accessor for accessing data that is received at said first clock rate;

an adaptive clock generator for generating an adaptive clock that comprises an adaptive clock rate that is based on an arrival rate of said data that is received at said first clock rate;

an accessor for accessing data that is received at said adaptive clock rate;

a determiner for determining a relationship between said first clock rate and said adaptive clock rate;

an access provider for providing access to data related to said relationship between said first clock rate and said adaptive clock rate;

an accessor for accessing said data related to said relationship between said first clock rate and said adaptive clock rate; and an adaptive clock adjuster for adjusting said adaptive clock rate based on a determined relationship between said first clock rate and said adaptive clock rate.

16. The system of claim 15 wherein said accessor for accessing said data that is transmitted at said first clock rate is associated with said network source side components.

17. The system of claim 15 wherein said accessor for accessing said data that is received at said first clock rate is associated with said network destination side components.

18. The system of claim 15 wherein said adaptive clock generator is associated with said network source side components.

19. The system of claim 15 wherein said determiner for determining a relationship between said first clock rate and said adaptive clock rate is associated with said network source side components.

20. The system of claim 15 wherein said adaptive clock adjuster for adjusting said adaptive clock rate based on a determined relationship between said first clock rate and said adaptive clock rate is associated with said network destination side components.

* * * * *